(12) United States Patent
Baxter et al.

(10) Patent No.: US 6,713,557 B2
(45) Date of Patent: Mar. 30, 2004

(54) REDOX SYSTEM AND PROCESS

(75) Inventors: Steven Michael Baxter, Chalfont, PA (US); Patrick Albert Clark, Valley Forge, PA (US)

(73) Assignee: Rohm and Haas Company, Philadelphia, PA (US)

( * ) Notice: Subject to any disclaimer, the term of this patent is extended or adjusted under 35 U.S.C. 154(b) by 172 days.

(21) Appl. No.: 09/990,038

(22) Filed: Nov. 20, 2001

(65) Prior Publication Data

US 2002/0099156 A1 Jul. 25, 2002

Related U.S. Application Data

(60) Provisional application No. 60/250,041, filed on Nov. 30, 2000.

(51) Int. Cl.[7] .................................................. C08F 2/16
(52) U.S. Cl. .................... 524/804; 502/300; 526/219.6; 526/229; 526/93; 526/94; 526/230
(58) Field of Search .................... 524/804; 502/300; 526/219.6, 229, 93, 94, 230

(56) References Cited

U.S. PATENT DOCUMENTS

| | | |
|---|---|---|
| 5,087,676 A | 2/1992 | Heider et al. .................. 526/93 |
| 5,710,226 A | 1/1998 | Lau ............................. 526/200 |

OTHER PUBLICATIONS

Wang et al., "Kinetic study of the mini–emulsion polymerization of styrene", Polymer, vol. 37 (No. 12), pp 2509–2516, 1996.*

Polymer vol. 37 No. 12 1996, pp 2509–2516, "Kinetic study of the mini–emulsion polymerization of styrene", Cheng Chien Wang, Nan San Yu, Chuh Yung Chen and Jen Feng Kuo, Dept. of Chemical Engr. National Cheng Kung Univ., Tainan 701, Taiwan, ROC.

Journal of Polymer Science: Part A: Polymeraly Chemical Vol 31, pp 3213–3222 (1993), "Study on Aqueous Polymerizations of Vinyl Monomers Initiated by Metal Oxidant–Chelating Agent Redox Initiators", Wen–Cheng Hsu, Jen–Feng Kuo, and Chuh–Yung Chen, Dept. of Chem. Engineering, Cheng Kung Univ. Tainan, Taiwan.

Journal of Applied Polymer Science, vol. 18, pp 1269–1277 (1974), "The Cobalt Chelates of Polyaminocarboxylic Acids as Initiators in the Emulstion Polymerization of Styrene", C. W. Brown and D. B. Hobson, The Univ. of Salford, Salford, M5 4WT, Lancashire, England.

* cited by examiner

*Primary Examiner*—William Cheung
(74) *Attorney, Agent, or Firm*—Stephen E. Johnson; Gary D. Greenblatt

(57) ABSTRACT

A process for preparing an aqueous emulsion polymer including providing at least one ethylenically unsaturated monomer and a free radical redox initiator system under emulsion polymerization conditions, the redox initiator system including an oxidant; a reductant and a metal promoter complex, and effecting the polymerization of at least some of the ethylenically unsaturated monomer is provided. Also provided is a process for reducing the residual ethylenically unsaturated monomer content of an aqueous emulsion polymer.

14 Claims, No Drawings

REDOX SYSTEM AND PROCESS

CROSS REFERENCE TO RELATED PATENT APPLICATIONS

This is a non-provisional application of prior pending U.S. provisional application serial No. 60/250,041 filed Nov. 30, 2000.

This invention relates to a redox initiator system for preparing emulsion polymers and aqueous dispersion polymers having low residual monomer content. More particularly, it relates to a process for reducing the residual monomer content in an aqueous emulsion polymer prepared from two or more ethylenically unsaturated monomers using a free radical redox initiator system, the redox system including at least one oxidant, at least one reductant and at least one metal-chelate promoter complex.

It is often desirable to employ redox systems as initiators for preparing aqueous emulsion polymers from ethylenically unsaturated monomers, particularly if polymerization at temperatures lower than those at which conventional thermal initiation systems provide an effective level of free radical production, namely temperatures below 85° C. However, some redox systems employing metal promoters have limited utility in preparing aqueous emulsion polymers and controlling residual monomer content. For example, the hydrogen peroxide-ferrous salt system catalyzes emulsion polymerization by the addition of iron ions, yet does not have utility in the preparation of all aqueous emulsion polymers, particularly those in which the pH of the aqueous phase is above 7, because the iron ions aggregate and precipitate at high pH. In such cases, it is a common practice to add chelating ligands such as ethylene diamine tetraacetic acid (EDTA) and its salts in order to maintain metal ion solubility and the polymerization is initiated by the free radicals formed by reaction between the complexed metal ion and peroxide. Conventional redox initiator systems employing metal salts such as iron(II), iron (III), cobalt (II) and Ce(IV) in which the metal ion is complexed with polyaminocarboxylic acids have been described in publications of Brown et al in the Journal of Applied Polymer Science, Vol. 18, pp. 1269–1277 (1974); Hsu et al in the Journal of Polymer Science, Part A, Polymer Chemistry, Vol. 31, pp. 3213–3222 (1993); and Wang et al in the journal Polymer, Vol. 37, pp. 2509–2516 (1996). However, some redox initiator systems are less efficient for reducing the residual monomer content than others, particularly for reducing levels of certain monomers. In addition, ligand complexation affects both the thermodynamics and kinetics of the redox cycle in an emulsion polymerization. The behavior of such redox initiator systems over a range of pH conditions can be complicated due to a number of factors, such as the interplay between the solubility of the metal ion or metal-chelate complex, competition among various potential ligands in the solution and the kinetics of various metal-mediated and direct reactions necessary to produce initiating radicals.

Conventional redox initiator systems used in preparing aqueous emulsion polymer dispersions of two or more ethylenically unsaturated monomers include an oxidant, sometimes referred to as a "catalyst", a reductant, often referred to as an "activator" and, optionally, a soluble transition metal ion, referred to as a "promoter". However, much of the use of redox initiator systems in emulsion polymerization is based on empirical observations and "rules of thumb". A number of different techniques have been employed to improve the solubility of the catalyst or promoter, but each technique has its limitations. For example, since metal ion solubility decreases as the pH of the aqueous phase of an emulsion polymerization increases, it is sometimes helpful to add a chelating agent such as EDTA to maintain solubility of the metal promoter. However, at high pH a chelating agent such as EDTA has a negative impact on reaction kinetics. The present invention provides a novel redox system which has utility in reducing residual monomer content in emulsion polymerization processes involving aqueous dispersions of monomers as compared to processes using alternative redox initiator systems.

U.S. Pat. No. 5,087,676 discloses a process for reducing the content of olefinically unsaturated monomers in an aqueous polymer dispersion using a free radical redox initiator system which is soluble and consists of an oxidizing agent, a reducing agent and a combination of iron and vanadium salts. Examples of suitable complexes which are added to keep the metals in solution under the reaction conditions disclosed are alkali metal salts of tartaric acid, citric acid, pyrophosphoric acid and ethylene diamine tetraacetic acid (EDTA).

Alternative redox initiator systems for reducing residual monomer content in aqueous dispersions of ethylenically unsaturated monomers using complexing agents which do not have unfavorable kinetics in reducing monomer levels at pH >7 and which can be employed for reducing monomer levels at temperatures less than 85° C., temperatures that exist for example in processing or storage tanks, are still desired. In addition, aqueous emulsion polymerization processes of two or more ethylenically unsaturated monomers using such redox initiator systems in reducing residual monomer content are desired. The inventors have surprisingly discovered that residual monomer content in aqueous emulsions of two or more ethylenically unsaturated monomers can be effectively reduced when certain free radical redox initiator systems are employed under the polymerization conditions, the redox initiator systems including an oxidant, a reductant and a metal promoter complex, wherein the metal promoter complex includes at least one soluble metal salt and at least one chelating ligand having fewer than six groups coordinated to the metal salt. Improvements have been discovered in reducing residual monomer content at the end of an emulsion polymerization, during the emulsion polymerization and at lower monomer chasing temperatures.

Inventors have discovered a strong compositional and pH dependence on the efficiency of various redox initiator pairs involving certain chelating ligands and metal promoters for controlling residual monomer levels in aqueous dispersion polymers prepared from one or more ethylenically unsaturated monomers. The effect of chelating ligands on the efficacy of monomer chasing using redox initiator systems is dependent on the mechanism of the redox initiator systems. Redox initiator systems which follow a conventional redox mechanism are strongly affected by the presence and nature of chelating ligands in aqueous emulsions of ethylenically unsaturated monomers under the condition of the polymerization. Inventors have further discovered that metal promoter complexes employing chelating ligands with lower metal coordination numbers (CN), such as tetradentate and pentadentate aminocarboxylate ligands (CN=4 and 5 respectively) have improved rates of reducing monomer levels as compared to metal promoter complexes employing hexadentate chelating ligands (CN=6) and maintain metal ion solubility over a range of pH that is sufficient for most practical emulsion processes, especially at lower monomer chasing temperatures. In addition, inventors have identified that some common by-products or oxidation products in an emulsion polymerization process can also function as weak metal ion chelating ligands. Inventors have discovered a process for the efficient reduction of residual monomer levels in an emulsion polymerization or an aqueous polymer dispersion. By employing this process, inventors demonstrate a range of chelating ligands having utility in that it is apparent such chelating ligands can not bind to all the coordination sites on the metal ion, leaving reactive sites on the metal ion accessible for radical generation and further catalysis. The process further improves the efficiency of redox initiator systems in new and existing aqueous polymer dispersions.

According to a first aspect of the present invention there is provided a redox initiator system for reducing residual monomer content in an aqueous emulsion polymer prepared from one or more ethylenically unsaturated monomers which includes at least one oxidant, at least one reductant and at least one metal promoter complex, the metal promoter complex consisting of at least one soluble metal salt and at least one chelating ligand having fewer than six metal coordinating groups.

According to a second aspect of the present invention there is provided a process for preparing an aqueous emulsion polymer which includes providing one or more monomers, each monomer having at least one ethylenically unsaturated group, and a redox initiator system under emulsion polymerization conditions, the redox initiator including at least one oxidant, at least one reductant and at least one metal promoter complex, wherein the metal promoter complex consists of at least one soluble metal salt and at least one chelating ligand having fewer than six metal coordinating groups, and effecting the polymerization of at least some monomer.

According to a third aspect of the present invention there is provided a process for reducing residual monomer content in an aqueous emulsion polymer prepared from one or more ethylenically unsaturated monomers, which includes contacting the aqueous emulsion polymer with a free radical redox initiator system, the redox initiator system including at least one oxidant, at least one reductant and at least one metal promoter complex, wherein the metal promoter complex consists of at least one soluble metal salt and at least one chelating ligand having fewer than six metal coordinating groups, and effecting the polymerization of at least some monomer.

The term "aqueous dispersion polymer" herein is not intended to include only free radical aqueous emulsion polymers prepared from monomers having ethylenically unsaturated groups. Rather, it is understood that the terms additionally covers hydrid polymers, including for example block copolymers, wherein the blocks include polycondensates such as polyesters or polyadducts such as polyurethanes, and are obtained by free radical polymerization of monomers having ethylenically unsaturated groups and graft copolymers, wherein the ethylenically unsaturated monomers are grafted on to polymers by free radical polymerization. It is essential that at least one monomer having one or more ethylenically unsaturated groups, is involved in the synthesis of the polymer dispersed in the aqueous phase for a problem of residual monomer removal to exist at all. The term "monomer chasing" herein refers to the removal of residual amounts of monomers in the aqueous emulsion polymers under the polymerization conditions using redox initiator systems of the present invention, which include at least one oxidant, at least one reductant and at least one metal promoter complex, the metal complex formed by reaction of at least one chelating ligand having fewer than six metal coordinating groups and at least one soluble metal ion. According to the invention, the manner in which the monomers are incorporated into the polymerization process appears to be unimportant. Moreover, the nature of the emulsion polymer dispersed in the aqueous phase appears to unimportant with regard to efficiency of the metal promoter complex in monomer chasing.

A redox initiator system usefully employed in accordance with the present invention includes at least one oxidant, at least one reductant and at least one metal promoter complex, the metal promoter complex consisting of at least one soluble metal ion and at least one chelating ligand having fewer than six metal coordinating groups.

Suitable oxidants of the redox initiator system include water-soluble oxidizing compounds such as, for example, hydrogen peroxide, peroxy acid salts, peroxodisulfuric acid and its salts, peroxy ester salts, ammonium and alkali metal peroxide salts, perborate salts and persulfate salts. Suitable oxidants of the redox initiator system also include water-insoluble oxidizing compounds such as, for example, dibenzoyl peroxide, t-butyl peroxide, lauryl peroxide, 2,2'-azo bis(isobutyronitrile) (AIBN), alkyl hydroperoxides such as tert-butyl hydroperoxide, tert-amyl hydroperoxide, pinene hydroperoxide and cumyl hydroperoxide, t-butyl peroxyneodecanoate, and t-butyl peroxypivalate. Compounds which donate oxygen with free radical formation and are not peroxides, such as alkali metal chlorates and perchlorates, transition metal oxide compounds such as potassium permanganate, managanese dioxide and lead oxide and organic compounds such as iodobenzene, may be usefully employed in accordance with the invention as oxidants. The term "water-insoluble" oxidants means oxidizing compounds having a water solubility of less than 20% by weight in water at 25° C. Peroxides, hydroperoxides and mixtures thereof are preferred and tert-butyl hydroperoxide is most preferred. Typical levels of oxidant range from 0.01% to 3.0%, preferably from 0.02% to 1.0% and more preferably from 0.05% to 0.5% by weight, based on the weight of the monomer used.

Suitable reductants of the redox initiator system include reducing compounds such as, for example, sulfur compounds with a low oxidation state such as sulfites, hydrogen sulfites, alkali metal bisulfites, ketone adducts of bisulfites such as acetone bisulfite, alkali metal disulfites, metabisulfites and its salts, thiosulfates, formaldehyde sulfoxylates and its salts, reducing nitrogen compounds such as hydroxylamine, hydroxylamine hydrosulfate and hydroxylammonium salts, polyamines and reducing sugars such as sorbose, fructose, glucose, lactose and derivatives thereof, enediols such as ascorbic acid and isoascorbic acid, sulfinic acids, hydroxy alkyl sulfinic acids such as hydroxy methyl sulfinic acid and 2-hydroxy-2-sulfinacetic acid and its salts, formadinesulfinic acid and its salts, alkyl sulfinic acids such propyl sulfinic acid and isopropyl sulfinic acid, aryl sulfinic acids such as phenyl sulfinic acid. The term "salts" includes for example sodium, potassium, ammonium and zinc ions. Sodium formaldehyde sulfoxylate, also known as SSF, is preferred. Typical levels of reductant range from 0.01% to 3.0%, preferably from 0.01% to 0.5% and more preferably from 0.025% to 0.25% by weight, based on the weight of the monomer used.

The metal promoter complex of the redox initiator system includes a water-soluble catalytic metal compound in the form of a salt and a chelating ligand. Suitable metal compounds include metal salts such as, for example iron(II, III) salts such as iron sulfate, iron nitrate, iron acetate and iron chloride, cobalt(II) salts, copper (I, II) salts, chromium (II)

salts, manganese salts, nickel(II) salts, vanadium salts such as vanadium(III) chloride, vanadium(IV) sulfate and vanadium(V) chloride, molybdenum salts, rhodium salts and cerium(IV) salts. It is preferred that metal compounds are in the form of hydrated metal salts. Typical levels of catalytic metal salts used in accordance with the invention range from 0.01 ppm to 25 ppm. Mixtures of two or more catalytic metal salts may also be usefully employed in accordance with the invention. Suitable chelating ligands having fewer than six metal coordinating groups include multidentate aminocarboxylate ligands such as, for example, nitrilotriacetic acid (NTA, a tetradentate ligand), ethylene diamine diacetic acid (EDDA, a tetradentate ligand), N(-hydroxyethyl)ethylene diamine triacetic acid (HEDTA, a pentadentate ligand), and ammonia diacetic acid (ADA, a tridentate ligand) Other suitable chelating ligands contemplated may include chelating ligands such as, for example, bidentate aminocarboxylate ligands, porphyrin ligands having one or two ancillary carboxylate ligands, nitrogen containing macrocycles having ancillary carboxylate ligands and mixtures of multidentate diamines, triamines and dicarboxylic acids. Combinations of two or more multidentate aminocarboxylate ligands may be usefully employed in accordance with the invention.

Redox initiator systems employing metal salts (so-called "classic redox" systems) in combination with multidentate chelating ligands are strongly influenced by coordination of the ligands to the metal catalyst and the solubility of the metal promoter complexes that are formed. Detailed solubility data for most metal ions in the presence of many common counter ions such as for example sulfate, acetate and chloride or chelating ligands such as EDTA are described in the publication by J. Kragten, Atlas of Metal-Ligand Equilibria in Aqueous Solution, Halsted Press, J. Wiley & Sons, New York, 1977. The hydrated metal salts typically used as catalysts in redox initiator systems, exist as in the form of so-called "free ions" or $[M(H_2O)_6]^{n+}$ only at very low pH values. At higher pH values (>7), proton loss from aqua ligands coordinated to the metal salt leads to coordination by hydroxide ions and further aggregation to polymetallic salts which ultimately precipitate from aqueous solution as a metal hydroxide. Addition of chelating ligands having six metal coordinating groups such as EDTA can prevent metal salt aggregation and preciptation. By the same token, addition of chelating ligands such as EDTA can prevent coordination of an oxidant or reductant resulting in lowered radical production in an emulsion polymerization or lowered monomer chasing kinetics in the redox cycle.

Metal complexes that promote the redox cycle in a redox initiator system must not only be soluble, but must have suitable oxidation and reduction potentials. Generally stated, the oxidant must be able to oxidize the low oxidation state of metal promoter complex (e.g. Fe(II)->Fe(III)) and conversely, the reductant must be able to reduce the high oxidation state of the metal promoter catalyst (e.g. Fe(III)->Fe(II)). The choice of a particular oxidant and reductant usefully employed in a redox initiator system for preparing aqueous emulsion polymers from two or more ethylenically unsaturated monomers depends on the redox potentials of the metal salts. In addition, the ratio of oxidant to reductant ranges from 0.1:1.0 to 1.0:0.1, depending on the redox potential of the metal salt employed. For the efficient reduction of monomer levels in an aqueous polymer dispersion prepared from one or more ethylenically unsaturated monomers, it is preferred that the chelating ligand used in combination with the soluble metal salt is a multidentate aminocarboxylate ligand having fewer than six groups available for coordination to the metal salt.

Oxidant and reductant are typically added to the reaction mixture in separate streams or as a single shot, preferably concurrently with the monomer mixture. The reaction temperature is maintained at a temperature lower than 100° C. throughout the course of the reaction. Preferred is a reaction temperature between 30° C. and 85° C., preferably below 60° C., more preferably between 30° C. and 45° C. The monomer mixture may be added neat or as an emulsion in water. The monomer mixture may be added in one or more additions or continuously, linearly or not, over the reaction period, or combinations thereof. The type and amount of redox initiator systems may be the same or different in the various stages of the emulsion polymerization.

According to the second aspect, the process for preparing an aqueous emulsion polymer of this invention includes providing one or more ethylenically unsaturated monomers and a free radical redox initiator system under emulsion polymerization conditions.

Monomers suitable for the novel process include hydrophobic and hydrophilic monoethylenically unsaturated monomers which can be subjected to free radical polymerization in a straight forward manner. "Hydrophilic" refers to monoethylenically unsaturated monomers which have high water solubility under the conditions of emulsion polymerization, as described in U.S. Pat. No. 4,880,842. "Hydrophobic" refers to monoethylenically unsaturated monomers which have low water solubility under the conditions of emulsion polymerization, as described in U.S. Pat. No. 5,521,266. The advantages of the novel process are realized when the residual monomers to be controlled or reduced include two or more monomers which differ from each other in terms of water solubility.

Suitable hydrophilic monoethylenically unsaturated monomers which are usefully employed in accordance with the invention include, for example, acrylic acid, methacrylic acid, acryloxypropionic acid, methacryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred.

Suitable hydrophobic monoethylenically unsaturated monomers which are usefully employed in accordance with the invention include, for example, styrene, alkyl-substituted styrenes, α-methyl styrene, p-methyl styrene, t-butyl styrene, vinyl toluene, ethylene, butadiene, vinyl acetate, vinyl propionate or other vinyl esters, vinyl chloride, vinylidene chloride, N-vinyl pyrollidone, allyl methacrylate, acrylonitrile, (meth)acrylonitrile, (meth)acrylamide, $(C_1–C_{20})$ alkyl esters of acrylic acid, such as ethyl acrylate, butyl acrylate and 2-ethyl hexyl acrylate, decyl acrylate, $(C_1–C_{20})$ alkyl or $(C_3–C_{20})$ alkenyl esters and amides of (meth)acrylic acid, such as methyl (meth)acrylate, ethyl (meth)acrylate, butyl (meth)acrylate, 2-ethyl hexyl (meth) acrylate, hydroxyethyl(meth)acrylate, hydroxypropyl(meth) acrylate, benzyl (meth)acrylate, lauryl (meth)acrylate, oleyl (meth)acrylate, palmityl (meth)acrylate, stearyl (meth) acrylate, aminoalkyl (meth)acrylate, N-alkyl aminoalkyl (methacrylate), N,N-dialkyl aminoalkyl (meth)acrylate, urieido (meth)acrylate, (meth)acrylonitrile and (meth) acrylamide. Use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively.

Monomer mixtures can optionally include polyethylenically unsaturated monomers. Suitable polyethylenically unsaturated monomers include alkylene glycol di(meth) acrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of $\alpha,\beta$-unsaturated mono- and dicarboxylic acids having terminal ethylenic unsaturation including allyl methacrylate, allyl acrylate, diallyl maleate, diallyl fumarate, diallyl itaconate and the like.

The free radical addition polymerization techniques used to prepare the aqueous emulsion polymers of this invention are well known in the art. Conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

In addition, a chain transfer agent such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in an amount of 0.1 to 5.0% by weight based on monomer weight may be used. Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

The emulsion polymerization is contemplated to include embodiments where some of the polymer is introduced by a polymer seed, formed in situ or not, or formed during hold periods or formed during periods wherein the monomer feed has ended and residual monomer is being converted to polymer.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

The emulsion polymer has an average particle diameter from 20 to 1000 nanometers, preferably from 70 to 300 nanometers. Particle sizes herein are those determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S. Pat. Nos. 5,340,858; 5,350,787; 5,352,720; 4,539,361; and 4,456,726.

As used herein, the term "sequentially emulsion polymerized" or "sequentially emulsion produced" refers to polymers (including homopolymers and copolymers) which are prepared in aqueous medium by an emulsion polymerization process in the presence of the dispersed polymer particles of a previously formed emulsion polymer such that the previously formed emulsion polymers are increased in size by deposition thereon of emulsion polymerized product of one or more successive monomer charges introduced into the medium containing the dispersed particles of the preformed emulsion polymer.

In the sequential emulsion polymerization of the multi-stage emulsion polymer, the term "seed" polymer is used to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization.

The glass transition temperature ("Tg") of the emulsion polymer is typically from −60° C. to 100° C., preferably from −20 C. to 50° C., the monomers and amounts of the monomers selected to achieve the desired polymer Tg range are well known in the art. Tgs used herein are those calculated by using the Fox equation (T. G. Fox, Bull. Am. Physics Soc., Volume 1, Issue No. 3, page 123(1956)), that is, for calculating the Tg of a copolymer of monomers M1 and M2, $$1/Tg(calc.)=w(M1)/Tg(M1)+w(M2)/Tg(M2) \quad \text{,wherein}$$

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers.

In the third aspect of the present invention there is provided a process for reducing residual monomer content in an aqueous emulsion polymer prepared from one or more ethylenically unsaturated monomers, which includes contacting the aqueous emulsion polymer with a free radical redox initiator system, the redox initiator system including at least one oxidant, at least one reductant and at least one metal promoter complex, wherein the metal promoter complex consists of at least one soluble metal ion and at least one chelating ligand having fewer than six metal coordinating groups, and effecting the polymerization of at least some monomer. The emulsion polymer of this aspect includes compositions, Tg, and particle sizes as described and exemplified hereinabove, prepared with the redox initiator system of this invention or any other free radical initiator means such as, for example, by thermal initiation and photoinitiation having a residual ethylenically unsaturated monomer content. The residual ethylenically unsaturated monomer content will typically be less than 5%, preferably less than 1%, by weight based on polymer weight. The emulsion polymer is then contacted with a redox initiator system composed of at least one oxidant, at least one reductant and at least one metal promoter complex, wherein the metal promoter complex consists of at least one soluble metal ion and at least one chelating ligand having fewer than six metal coordinating groups in composition and amounts as described and exemplified herein above and the polymerization of at least some, preferably at least 50%, more preferably at least 90%, of the residual ethylenically unsaturated monomer is effected under conditions as described herein above.

The emulsion polymer of this invention and the emulsion polymer having reduced residual monomer of this invention may be used in paints, exterior coatings, elastomeric coatings, paper coatings, leather coatings, adhesives, nonwoven materials and the like.

The following examples are presented to illustrate the invention and the results obtained by the test procedures.

Abreviations
tBHP=tert-butyl hydroperoxide
SSF=sodium sulfoxylate formaldehyde
IAA=isoascorbic acid
MMA=methyl methacrylate
MAA=methacrylic acid
AA=acrylic acid
EA=ethyl acrylate
BA=butyl acrylate
VAC=Vinyl acetate
AN=acrylonitrile
STY=styrene
EDTA=ethylene diamine tetraacetic acid
EDDA=ethylene diamine diacetic acid
NTA=nitrilo triacetic acid
HEDTA=N-(hydroxyethyl)ethylene diamine triacetic acid
DETPA=diethylene triamine pentaacetic acid
DI water=deionized water Experimental Procedure for Monomer Chasing A 1-liter, four necked round bottom flask was equipped with paddle stirrer, thermometer, nitrogen inlet, condenser and charged with 58.7 g DI water, 2.0 g of a 10% solution of sodium acetate and 111.4 g of a latex seed of BA/MMA/MAA (100 nm, 44.9% solids). The reaction flask was purged of oxygen under a nitrogen atmosphere and heated to 40° C. A monomer mixture consisting of 2.0 g BA and 0.5 g MMA was added and allowed to stir in the closed system for 5 minutes without purging. Via micro-pipette, 105 μl of a 0.2% (w/w) aqueous solution of $FeSO_4.7H_2O$ was added. Two co-feed solutions consisting of 0.095 g tBHP/ 5 g DI water and 0.065 g IAA/ 5 g DI water were fed at 0.17 mL/min. for 0.5 hr. Samples were taken at 0, 5, 15 and 30 minute time increments for GC.

Test Methods
Determination of BA and MMA Levels by GC Technique
Hewlett Packard 5890 Series II Gas Chromatograph
Column: HP-Wax (Agilent/Hewlett-Packard) 30M Length, 0.32 mm ID, 0.5 um Film
Temperature Program (in ° C.)
Injector Temp. 180
Detector Temp. 250
Initial 45 for 5 min.—Rate 20/min to 245—hold 245 for 3 min.

COMPARATIVE EXAMPLE I

Reduction of Residual Monomer

Experimental data for the redox initiator system tBHP, SSF and $FeSO_4.7H_2O$ system at pH 6.

| | BA/MMA | |
|---|---|---|
| Chelator used (2 equiv/Fe) | Initial BA/MMA (ppm) | Final BA/MMA (ppm) |
| none | 9972/2723 | 386/<10 |
| EDTA | 8803/1943 | 6728/1226 |
| NTA | 9600/2843 | 37/<10 |

| | BA/Sty | |
|---|---|---|
| Chelator used (2 equiv/Fe) | Initial BA/Sty (ppm) | Final BA/Sty (ppm) |
| none | 17825/11805 | 4345/563 |
| EDTA | 23365/15704 | 12332/6333 |
| NTA | 19885/13400 | 2024/26 |

| | BA/VAc | |
|---|---|---|
| Chelator used (2 equiv/Fe) | Initial BA/VAc (ppm) | Final BA/VAc (ppm) |
| none | N/M | N/M |
| EDTA | 2949/8633 | 1004/13642 |
| NTA | 2476/11759 | <10/2493 |

| | BA/AN | |
|---|---|---|
| Chelator used (2 equiv/Fe) | Initial BA/AN (ppm) | Final BA/AN (ppm) |
| none | 29736/2859 | 2519/500 |
| EDTA | 29660/2701 | 13080/650 |
| NTA | 25643/1566 | 1198/115 |

COMPARATIVE EXAMPLE II

Reduction of Residual Monomer

Experimental data for the redox initiator system tBHP, IAA and $FeSO_4.7H_2O$ system at pH 6.
0.74 mmol tBHP
0.37 mmol IAA

| | BA/MMA (after 15 min) | |
|---|---|---|
| Chelator used (2 equiv/Fe) | Initial BA/MMA (ppm) | Final BA/MMA (ppm) |
| none | 10284/2278 | 64/<10 |
| EDTA | 8965/2426 | 208/<10 |
| NTA | 8994/2522 | <10/<10 |

-continued

BA/Sty

| Chelator used (2 equiv/Fe) | Initial BA/Sty (ppm) | Final BA/Sty (ppm) |
|---|---|---|
| none | N/A | N/A |
| EDTA | 17517/11486 | 1310/19 |
| NTA | 18889/12427 | 10/<10 |

BA/VAc

| Chelator used (2 equiv/Fe) | Initial BA/VAc (ppm) | Final BA/VAc (ppm) |
|---|---|---|
| none | 2950/22780 | <10/4340 |
| EDTA | 2691/23282 | <10/5756 |
| NTA | 2812/24179 | <10/67 |

BA/AN

| Chelator used (2 equiv/Fe) | Initial BA/AN (ppm) | Final BA/AN (ppm) |
|---|---|---|
| none | 30253/2235 | 658/221 |
| EDTA | 25484/2934 | 692/156 |
| NTA | 30488/2440 | 267/103 |

The process for reducing the residual ethylenically unsaturated monomer content of a wide range of aqueous emulsion copolymers using the tetradentate chelating ligand NTA of this invention is substantially more effective in reducing the residual monomer level as compared to using the hexadentate chelating ligand EDTA in both Comparative Examples I and II. The utility of chelating ligands such as NTA in chasing down residual monomer content is realized at both acidic and basic pH in an aqueous emulsion polymerization. The pH range preferably ranges from 4 to 9, most preferably from 5.5 to 7.5. Frequently, the pH of the aqueous emulsion polymerization is influenced by the composition of the monomer mixture or by the addition of reductants or oxidants. The desired pH range can be maintained by the addition of small amounts of organic or inorganic acids such as, for example, acetic acid, ascorbic acid, hydrochloric acid, sulfuric acid, or phosphoric acid and small amounts of organic or inorganic bases such as, for example, ammonia, amines and alkali metal hydroxides, if necessary supported by buffer systems.

COMPARATIVE EXAMPLE III

Reduction of Residual Monomer and pH Range

The same experimental procedure as described above was used and monomer data are in ppm. For comparison, pH range for reducing BA/Sty levels using the redox initiator system tBHP, SSF, and FeSO$_4$ using no chelating ligand.

| | | pH 2.5 | pH 4.5 | pH 6 | pH 7 | pH 9 |
|---|---|---|---|---|---|---|
| no chelator | Init BA/S | 22690/ 16250 | 18760/ 12440 | 17825/ 11805 | 17500/ 11300 | 20880/ 14370 |
| | Final BA/S | 298/<10 | 225/<10 | 4345/563 | 9130/ 3840 | 15750/ 9070 |

COMPARATIVE EXAMPLE IV

Reduction of Residual Monomer and pH Range

The same experimental procedure as described above was used and monomer data are in ppm. For comparison, pH range for reducing BA/Sty levels using the redox initiator system tBHP, SSF, FeSO$_4$ with a tetradentate chelating ligand, NTA and a hexadentate chelating ligand EDTA.

| | | pH 2.5 | pH 4.5 | pH 6 | pH 7 | pH 9 |
|---|---|---|---|---|---|---|
| 2 eq EDTA | Init BA/S | 20080/ 14190 | 22200/ 15690 | 23370/ 15700 | 20590/ 13770 | 19710/ 13210 |
| | Final BA/S | 125/<10 | 9440/ 4060 | 12330/ 6330 | 12610/ 6770 | 9170/ 4440 |
| 2 eq NTA | Init BA/S | 21930/ 15050 | 19280/ 12810 | 19890/ 13400 | 18390/ 12160 | 19860/ 13410 |
| | Final BA/S | 105/<10 | 291/<10 | 2020/26 | 3380/316 | 10700/ 4630 |

COMPARATIVE EXAMPLE V

Reduction of Residual Monomer: pH Range and Chelating Ligand

The same experimental procedure as described above was used and monomer data are in ppm. For comparison, pH range and effect of various chelating ligands for reducing BA/Sty levels using the redox initiator system tBHP, SSF, and FeSO$_4$.

| | | NTA (4) | EDDA (4) | HEDTA (5) | EDTA (6) | DETPA (8) |
|---|---|---|---|---|---|---|
| pH 4.5 | Init BA/S | 19280/ 12810 | 16150/ 10570 | 20890/ 13670 | 22200/ 15690 | 20340/ 14130 |
| | Final BA/S | 291/<10 | 422/<10 | 2430/101 | 9440/ 4060 | 12300/ 6620 |
| pH 6 | Init BA/S | 19890/ 13400 | 21600/ 15140 | 17050/ 11140 | 23370/ 15700 | 20390/ 13630 |
| | Final BA/S | 2020/26 | 1458/36 | 5620/1480 | 12330/ 6330 | 15390/ 9200 |

The process for reducing the residual ethylenically unsaturated monomer content of a wide range of aqueous emulsion copolymers using the tetradentate chelating ligand NTA of this invention is substantially more effective in reducing the residual monomer levels over a range of pH that is sufficient for most practical applications in aqueous emulsion polymerization as compared to using no chelating ligand or to using the hexadentate chelating ligand EDTA of Comparative Examples III and IV. Moreover, multidentate chelating ligands having fewer than six groups available for metal ion complexation, such as, for example, NTA and EDDA are substantially more effective in reducing the residual monomer levels than hexadentate chelating ligands such as EDTA in reducing the residual monomer levels. From the experimental data in Comparative Examples V, it is apparent that there is a correlation between the metal coordination number (CN) of a particular multidentate chelating ligand and its efficiency in reducing the residual monomer levels. Tetradentate and pentadentate chelating ligands are substantially more effective in reducing the residual monomer levels than hexadentate chelating ligands, especially at lower monomer chasing temperatures. It is apparent such chelating ligands can not bind to all the coordination sites on the metal ion, leaving reactive sites on the metal ion accessible for radical generation and further catalysis. It is contemplated that tridentate and bidentate aminocarboxylate chelating ligands would also have favorable monomer chasing kinetics as compared to hexadentate ligands. The experimental data demonstrate a range of multidentate chelating ligands which have utility in redox initiator systems and in new and existing aqueous emulsion polymer processes.

The experimental data in the Comparative Examples highlight the fact that there can be a number of compounds present as ingredients in a typical aqueous emulsion polymerization that have the ability to act as chelating ligands with metal salts under various conditions such as for example, IAA, oxalate, halides or mercaptans. The presence of a strong chelating ligand such as EDTA will generally dominate the metal promoter complex, however, it will slow the monomer chasing kinetics dramatically. Tetradentate ligands such as for example, NTA and EDDA will dominate the complexation chemistry of the metal promoter complex in aqueous emulsion polymerization under most reaction conditions, yet with a much less detrimental effect on the monomer chasing kinetics.

We claim:

1. A redox initiator system for reducing residual monomer content in an aqueous emulsion polymer containing one or more ethylenically unsaturated monomers, which comprises at least one oxidant, at least one reductant and at least one metal promoter complex, wherein the metal promoter complex comprises at least one soluble metal salt and one or more chelating ligands having fewer than six metal coordinating groups.

2. The redox initiator system of claim 1 wherein the chelating ligandi is a multidentate aminocarboxylate ligand selected from the group consisting of nitrilo triacetic acid, ethylene diamine diacetic acid, N-(hydroxyethyl)ethylene diamine triacetic acid, ammonia diacetic acid, and combinations thereof.

3. The redox initiator system of claim 2 wherein the oxidant is selected from the group consisting of t-butyl peroxide, lauryl peroxide, 2, 2'-azo bis(isobutyronitrile) (AIBN), tert-butyl hydroperoxide, tert-amyl hydroperoxide, pinene hydroperoxide, cumyl hydroperoxide, t-butyl peroxyneodecanoate, t-butyl poroxypivalate and combinations thereof, wherein the reductant is selected from the group consisting of formaldehyde sulfoxylates and its salts, acetone bisulfite, reducing nitrogen compounds, hydroxylammonium salts, reducing sugars, ascorbic acid, isoascorbic acid, sulfinic acids, formadinesulfinic acid and its salts, hydroxy alkyl sulfinic acids, alkyl sulfinic acids and its salts, the salts selected from the group consisting of sodium ions, potassium ions, ammonium ions, zinc ions and combinations thereof, and wherein the metal salt is selected from the group consisting of iron salts, cobalt salts, copper salts, chromium salts, manganese salts, nickel salts, vanadium salts, molybdenum salts, rhodium salts, cerium(IV) salts and combinations thereof.

4. A process for preparing an aqueous emulsion polymer comprising providing one or more ethylenically unsaturated monomers and a free radical redox initiator system under emulsion polymerization conditions, the redox intiator system comprising at least one oxidant, at least one reductant and at least one metal promoter complex, the metal promoter complex further comprising at least one soluble metal salt and one or more chelating ligands having fewer than six metal coordinating groups; and effecting the polymerization of at least some of said ethylenically unsaturated monomer.

5. The process of claim 4 wherein the chelating ligand is a multidentate aminocarboxylate ligand selected from the group consisting of nitrilo triacetic acid, ethylene diamine diacetic acid, N-(hydroxyethyl)ethylene diamine triacetic acid, ammonia diacetic acid, and combination thereof, wherein the oxidant is a hydroperoxide and the reductant is selected from the group consisting of formaldehyae sulfoxylates and its salts, acetone bisulfite, reducing nitrogen compounds, hydroxylammonium salts, reducing sugars, ascorbic acid, isoascorbic acid, sulfinic acids formadinesulfinic acid and its salts, hydroxy alkyl sulfinic acids, alkyl sulfinic acids and its salts, the salts selected from the group consisting of sodium ions, potassium ions, ammonium ions, zinc ions and combinations thereof, and wherein the metal salt is selected from the group consisting of iron salts, cobalt salts, copper salts, chromium salts, manganese salts nickel salts, vanadium salts, molybdenum salts, rhodium salts, cerium (IV) salts and combinations thereof.

6. The process of claim 5 wherein the pH of the emulsion polymerization ranges from 4 to 9.

7. The process of claim 5 wherein the pH of the emulsion polymerization ranges from 5.5 to 7.5.

8. The process of claim 6 wherein the polymerization of at least 95% by weight of said ethylenically unsaturated monomer is effected.

9. A process for reducing the residual ethylencially unsaturated monomer content of an aqueous emulsion polymer comprising contacting said emulsion polymer with a free radical redox initiator system, wherein the redox initiator system comprises at least one oxidant, at least one reductant and at least one metal promoter complex, the metal promoter complex further comprising at least one soluble metal salt and one or more chelating ligands having fewer than six metal coordinating groups; and effecting the polymerization of at least some of the residual ethylenically unsaturated monomer.

10. The process of claim 9 wherein the chelating ligand is a multidentate aminocarboxylate ligand selected from the group consisting of nitrilo triacetic acid, ethylene diamine diacetic acid, N-(hydroyethyl)ethylene diamine triacetic acid, ammonia diacetic acid, and combination thereof, wherein the oxidant is a hydroperoxide and the reductant is selected from the group consisting of formaldehyde sulfoxylate and its salts, reducing nitrogen compounds, hyroxylammonium salts, reducing sugars, ascorbic acid, isoascorbic acid, sulfinic acids, formanidine sulfinic acid and its salts, hydroxy alkyl sulfinic acids, alkyl sulfinic acids and its salts, the salts selected from the group consisting of sodium ions, potassium ions, ammonium ions, zinc ions and combinations thereof, and wherein the metal salt is selected from the group consisting of iron salts, cobalt salts, copper salts, chromium salts, manganese salts, nickel salts, vanadium salts, molybdenum salts, rhodium salts, cerium(IV) salts and combinations thereof.

11. The process of claim 10 wherein the pH of the polymerization medium ranges from 4 to 9.

12. The process of claim 10 wherein the ph of the polymerization medium ranges from 5.5 to 7.5.

13. The process of claim 10 wherein the polymerization of at least 90% by weight of said residual ethylenically unsaturated monomer is effected.

14. The redox initiator system of claim 1 wherein the chelating ligand is a tetradentate or pentadentate chelating ligand.

* * * * *

UNITED STATES PATENT AND TRADEMARK OFFICE
CERTIFICATE OF CORRECTION

PATENT NO. : 6,713,557 B2
DATED : March 30, 2004
INVENTOR(S) : Steven Michael Baxter and Patrick Albert Clark It is certified that error appears in the above-identified patent and that said Letters Patent is hereby corrected as shown below:

Column 4,
Line 53, change "formadinesulfinic acid" to -- formamidinesulfinic acid --.

Column 13,
Line 28, change "ligandi" to -- ligand --.
Line 38, change "poroxypivalate" to -- peroxypivalate --.
Line 43, change "formadinesulfinic acid" to -- formamidinesulfinic acid --.

Column 14,
Line 5, change "formaldehyae" to -- formaldehyde --.
Line 8, change "formadinesulfinic acid" to -- formamidinesulfinic acid --.
Line 44, change "formanidine sulfinic acid" to -- formamidinesulfinic acid --.

Signed and Sealed this

Eighth Day of June, 2004

JON W. DUDAS
*Acting Director of the United States Patent and Trademark Office*